United States Patent
Murai et al.

(10) Patent No.: US 8,660,123 B2
(45) Date of Patent: *Feb. 25, 2014

(54) BROADCAST-CONTENT TRANSMISSION APPARATUS, AND BROADCAST-CONTENT TRANSMISSION METHOD

(75) Inventors: Jun Murai, Fujisawa (JP); Takaaki Ishida, Fujisawa (JP); Kotaro Kataoka, Fujisawa (JP); Hiroaki Kimura, Shinjuku (JP); Shingo Izawa, Shinjuku (JP)

(73) Assignees: KDDI Corporation, Tokyo (JP); Keio University, Tokyo (JP)

( * ) Notice: Subject to any disclaimer, the term of this patent is extended or adjusted under 35 U.S.C. 154(b) by 276 days.

This patent is subject to a terminal disclaimer.

(21) Appl. No.: 12/296,585

(22) PCT Filed: Sep. 13, 2006

(86) PCT No.: PCT/JP2006/318146
§ 371 (c)(1),
(2), (4) Date: Oct. 9, 2008

(87) PCT Pub. No.: WO2008/032371
PCT Pub. Date: Mar. 20, 2008

(65) Prior Publication Data
US 2009/0274151 A1 Nov. 5, 2009

(51) Int. Cl.
*H04L 12/28* (2006.01)

(52) U.S. Cl.
USPC ......... 370/390; 370/432; 370/474; 370/312; 370/352; 455/7; 455/130

(58) Field of Classification Search
USPC .................................................. 370/390
See application file for complete search history.

(56) References Cited

U.S. PATENT DOCUMENTS

| 6,262,721 | B1 * | 7/2001 | Tsukidate et al. | 715/721 |
| 6,307,837 | B1 * | 10/2001 | Ichikawa et al. | 370/230 |
| 6,684,241 | B1 * | 1/2004 | Sandick et al. | 709/220 |
| 8,077,715 | B2 * | 12/2011 | Kimura et al. | 370/390 |

(Continued)

FOREIGN PATENT DOCUMENTS

EP  1 001 627 A1  5/2000
JP  2001-111504 A  4/2001

(Continued)

OTHER PUBLICATIONS

Korean Office Action, issued Apr. 23, 2010 for corresponding Korean Patent Application No. 10-2008-7026534.

(Continued)

*Primary Examiner* — Ayaz Sheikh
*Assistant Examiner* — Hai-Chang Hsiung
(74) *Attorney, Agent, or Firm* — Westerman, Hattori, Daniels & Adrian, LLP

(57) ABSTRACT

A transmitting side (101) transmits broadcast content (100) through a communication network (111) or a broadcast network (110). Transmission through the communication network (111) involves an addition of an IP header (100*b*) to the broadcast content (100) for packetization as an IP packet (100*a*) and transmission to a terminal device (112) on a receiving side (102). Transmission through the broadcast network (110) involves encapsulation of the IP packet into a given transmission packet (105) used with a digital broadcast signal for transmission to the terminal device on the receiving side (102).

4 Claims, 10 Drawing Sheets

(56) References Cited

U.S. PATENT DOCUMENTS

| | | | |
|---|---|---|---|
| 2002/0154887 A1* | 10/2002 | Lu ................................. | 386/35 |
| 2003/0026241 A1* | 2/2003 | Ono et al. ..................... | 370/349 |
| 2003/0039237 A1* | 2/2003 | Forslow ........................ | 370/352 |
| 2003/0162495 A1* | 8/2003 | Yonemoto et al. ............... | 455/7 |
| 2005/0153650 A1* | 7/2005 | Hikomoto ..................... | 455/3.01 |
| 2005/0273833 A1* | 12/2005 | Soinio ............................ | 725/113 |
| 2007/0160017 A1* | 7/2007 | Meier et al. .................... | 370/338 |
| 2009/0245250 A1* | 10/2009 | Kimura et al. ................ | 370/390 |

FOREIGN PATENT DOCUMENTS

| | | |
|---|---|---|
| JP | 2003-78830 A | 3/2003 |
| JP | 2003-152544 A | 5/2003 |
| JP | 2003-258835 A | 9/2003 |
| JP | 2004-187180 A | 7/2004 |
| JP | 2005-536902 A | 12/2005 |
| WO | 03/030460 A2 | 4/2003 |

OTHER PUBLICATIONS

Japanese Office Action dated Jun. 8, 2010, issued in corresponding Japanese Patent Application No. 2005-106815.

M.-J. Montpetit et al. "RFC 4259: A Framework for Transmission of IP Datagrams over MPEG-2 Networks," (online) Nov. 2005; retrieved on Dec. 11, 2006; pp. 1-42; Cited ISR.

International Search Report of PCT/JP2006/318146; date of mailing Dec. 26, 2006.

Wahlberg, Goran; "IP Datacast"; DVB, Digital Video Broadcasting, C/O EBU—17A Ancienne Route-CH-1218 Grand Saconnex, Geneva—Switzerland, Mar. 28, 2004, pp. 1-9.

European Search Report dated Dec. 23, 2010, issued in corresponding European Patent Application No. 06810103.9.

May, G.; "The IP Datacast System-Overview and Mobility Aspects"; Consumer Electronics, 2004 IEEE, International Symposium on Reading, UK, Sep. 1-3, 2004, Piscataway, NJ, USA, IEEE, pp. 509-514.

Chinese Office Action dated Feb. 10, 2011, issued in corresponding Chinese Patent Application No. 200680054445.1.

European Office Action dated Nov. 9, 2011, issued in corresponding European Patent Application No. 06810103.9.

Summoms to attend oral proceeding pursuant to Rule 115(1) EPC dated Aug. 3, 2012, issued in corresponding European Patent Application No. 06810103.9 (4 pages).

* cited by examiner

FIG.6

| IP-MULTICAST GROUP ADDRESS | BROADCAST CONTENT (PROGRAM, COMMERCIAL) | PREFERRED RECIPIENT |
|---|---|---|
| A | PROGRAM FOR MOUNTAIN | GPS INFORMATION INDICATIVE OF MOUNTAIN SIDE (OTHER, ATTRIBUTE INFORMATION, ETC.) |
| B | PROGRAM FOR COAST | GPS INFORMATION INDICATIVE OF COAST SIDE (OTHER, ATTRIBUTE INFORMATION, ETC.) |

1000

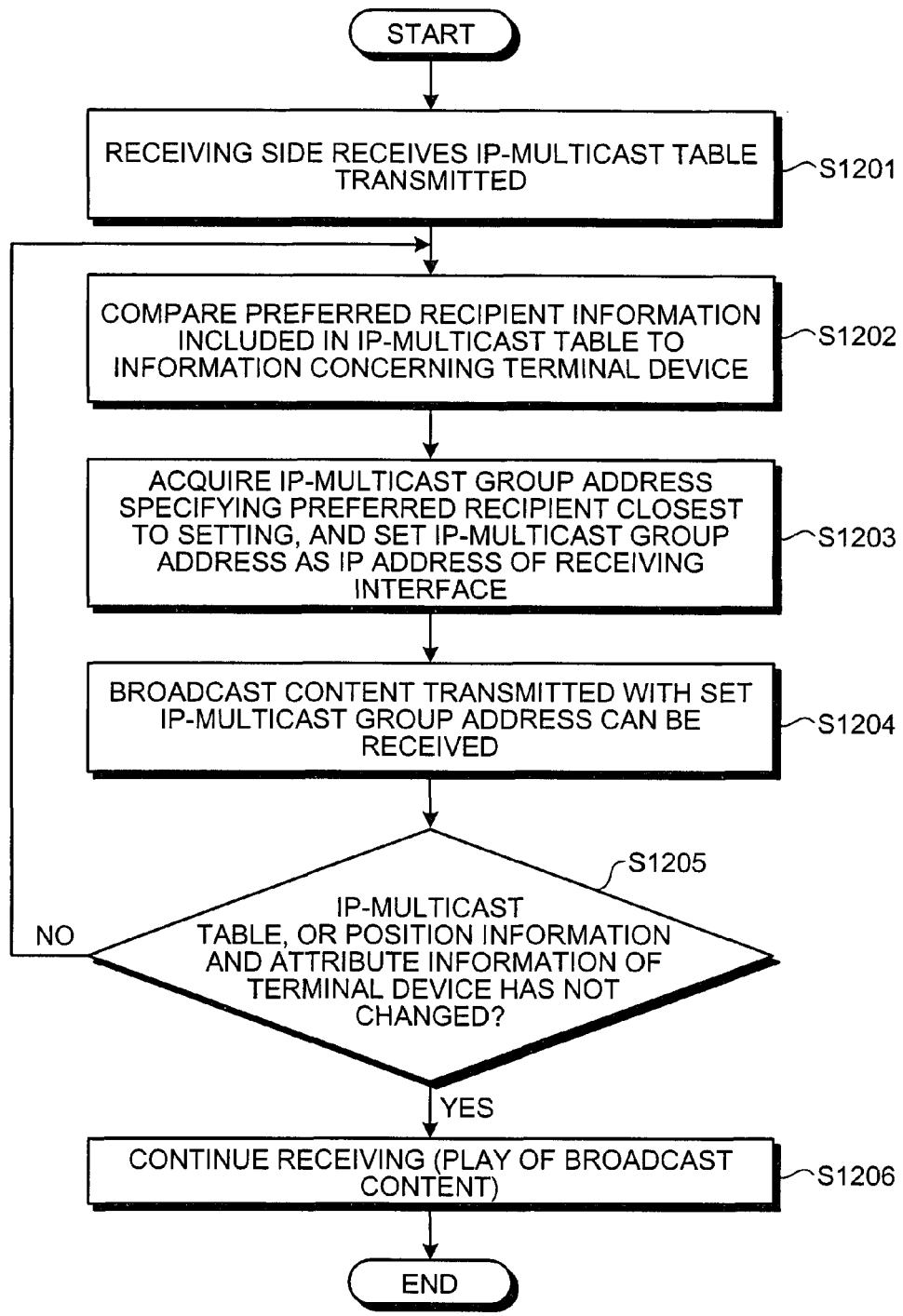

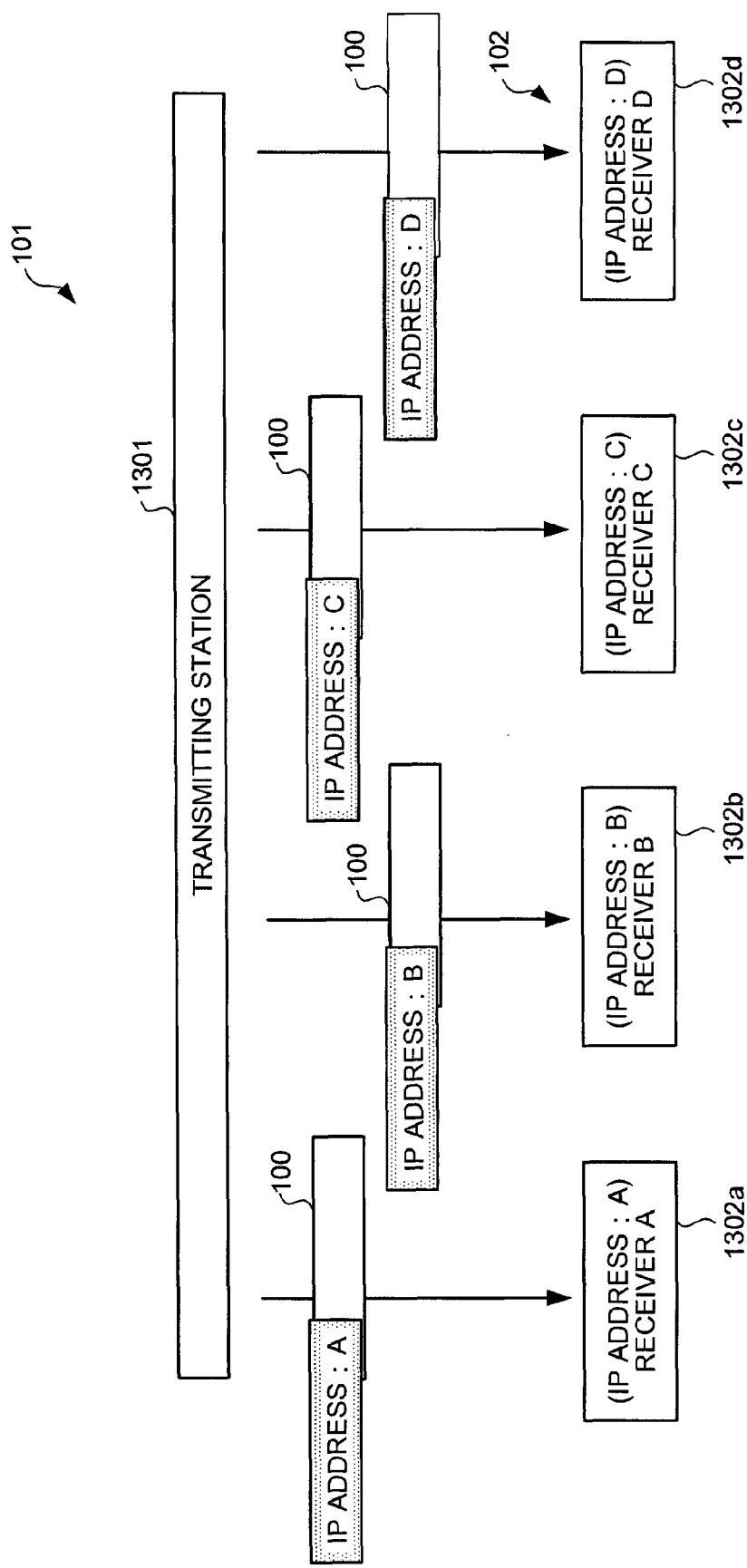

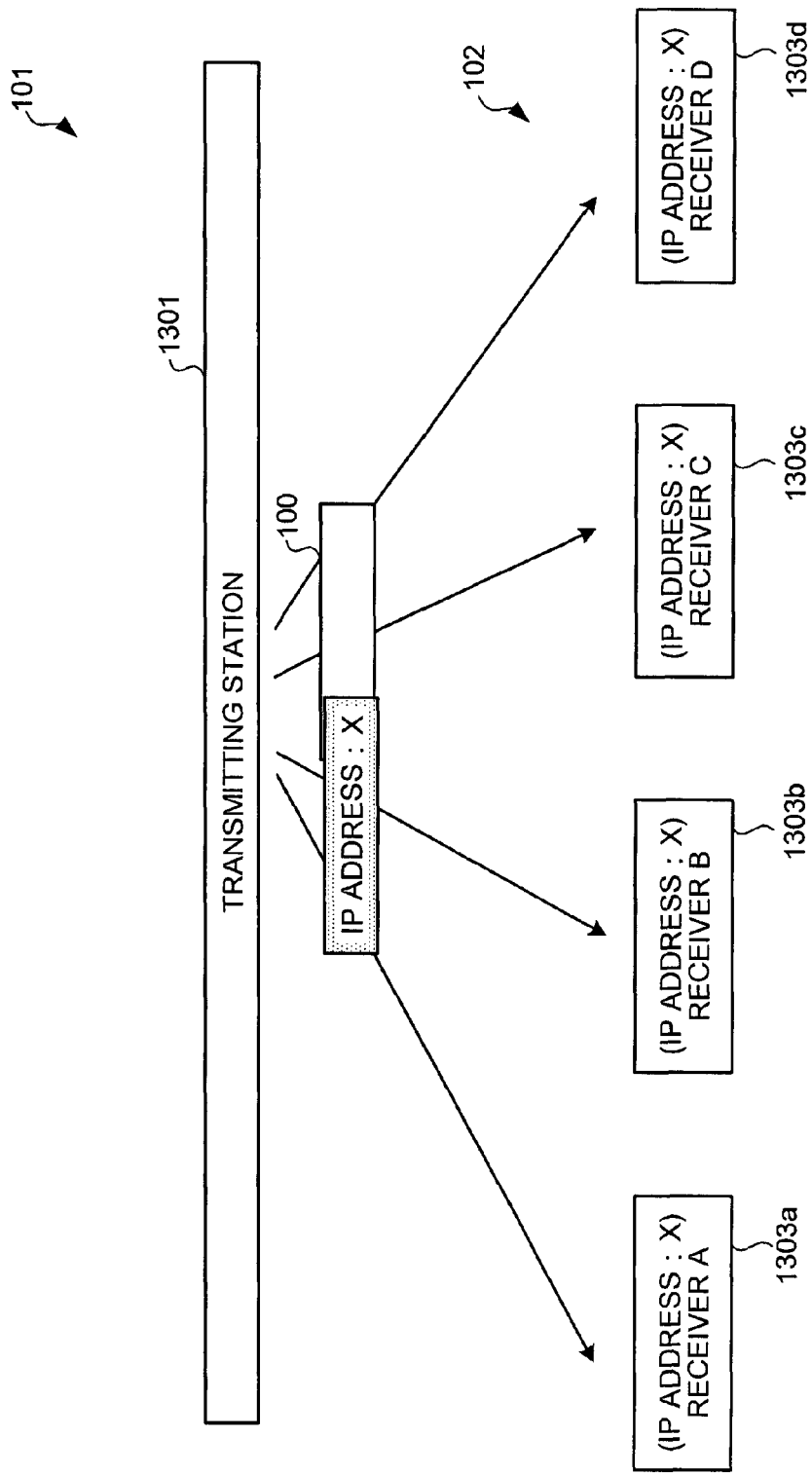

BROADCAST-CONTENT TRANSMISSION APPARATUS, AND BROADCAST-CONTENT TRANSMISSION METHOD

TECHNICAL FIELD

The present invention relates to a broadcast-content transmission apparatus that transmits broadcast content, and more particularly to a broadcast-content transmission apparatus and a broadcast-content transmission method enabling transmission of the same broadcast content to a user through both a communication network and a broadcast network.

BACKGROUND ART

Conventionally, the digitalization of programs broadcasted through a broadcast network, such as that for terrestrial broadcasts, is progressing and the distribution of broadcast content by utilizing high-capacity and high-speed properties of communication networks, such as the Internet, has been gaining momentum.

In digital broadcasts of recent years, data can be exchanged through bidirectional communication between a transmitter and a receiver. This technology enables data to be exchanged through the Internet, and a digital-broadcast receiving apparatus receiving a digital broadcast obtains information concerning a bidirectional web server relevant to the corresponding broadcast content, and communicates with the web server through the Internet, etc. (see, for example, Patent Document 1 below).

Patent Document 1: Japanese Patent Application Laid-open Publication No. 2003-78830

DISCLOSURE OF INVENTION

Problem to be Solved by the Invention

However, with the conventional technology above, a transmitter cannot transmit the broadcast content to a user through various transmission media without changing the broadcast content to an appropriate format according to each transmission medium, e.g., the broadcast network or the communication network. Presently, there is a problem in that most of the broadcast programs broadcasted through a broadcast network and the broadcast content distributed through a communication network, such as the Internet, are independently produced and the program content is limited to each respective transmission medium. Hence, the same content cannot be transmitted through both the broadcast network and the communication network. Furthermore, two different apparatuses are required, one which plays the content distributed through the communication network, and the other which plays the content received through the broadcast network.

To solve the above problems, it is an object of the present invention to propose a broadcast-content transmission apparatus and a broadcast-content transmission method that can eliminate restrictions between the broadcast network and the communication network, and transmit the same broadcast content to a user through both the communication network and the broadcast network.

Means for Solving Problem

To solve the problems above and achieve an object, a broadcast-content transmission apparatus according to an invention of claim 1 includes an IP packetizing unit that IP packetizes content and adds an IP header thereto; an encapsulating unit that encapsulates an IP packet of the content IP packetized by the IP packetizing unit into a transmission packet for use with a digital broadcast signal; and a transmitting unit that transmits, through a broadcast network, the transmission packet including the IP packet encapsulated by the encapsulating unit.

A broadcast-content transmission apparatus according to an invention of claim 2, based on the invention of claim 1, is characterized by the transmitting unit transmitting the transmission packet by IP multicast.

A broadcast-content transmission apparatus according to an invention of claim 3, based on claim 1 or 2, further includes an IP-multicast-correspondence-information generating unit that generates, for each item of the content, information concerning IP multicast correspondence correlating an IP-multicast group address and a condition of a receiving-side device that receives the content, in which the transmitting unit transmits the information concerning the IP multicast correspondence to an arbitrary receiving-side node.

A broadcast-content transmission apparatus according to an invention of claim 4 includes a receiving unit that receives, through a broadcast network, a transmission packet that is an IP packet encapsulated; and an extracting unit that decapsulates the transmission packet received by the receiving unit, and extracts content included in the IP packet.

A broadcast-content transmission apparatus according to an invention of claim 5, based on the invention of claim 4, further includes a selecting unit that compares an IP address of the IP packet extracted by the extracting unit to an IP address set in advance, selects and receives the IP packet having the IP address identical to the IP address set in advance.

A broadcast-content transmission apparatus according to an invention of claim 6, based on the invention of claim 5, further includes an IP-multicast-correspondence-information receiving unit that receives, for each item of the content, information concerning an IP multicast correspondence correlating an IP-multicast group address and a condition for receiving the content, in which the selecting unit selects the content when the condition indicated by the information concerning the IP multicast correspondence and received by the IP-multicast-correspondence-information receiving unit matches a condition set in advance.

A broadcast-content transmission apparatus according to an invention of claim 7, based on any one of claims 4 to 6, further includes a routing unit that transmits the content selected by the selecting unit to an external device connected to a given communication network.

A broadcast-content transmission method according to an invention of claim 8 includes an IP packetizing step of IP packetizing content and adding an IP header thereto; an encapsulating step of encapsulating an IP packet of the content IP packetized at the IP packetizing step into a given transmission packet to be used with a digital broadcast signal; and a transmitting step of transmitting, through a broadcast network, the transmission packet including the IP packet encapsulated at the encapsulating step.

A broadcast-content transmission method according to an invention of claim 9 includes a receiving step of receiving, through a broadcast network, a transmission packet that is an IP packet encapsulated; and an extracting step of decapsulating the transmission packet received at the receiving step, and extracting content included in the IP packet.

Effect of the Invention

According to the broadcast-content transmission apparatus and the broadcast-content transmission method, transmission of the same broadcast content to a user through both the communication network and the broadcast network can be achieved. Furthermore, an effect of transmitting and receiving content for each recipient according to an attribute of the recipient can be achieved.

BRIEF DESCRIPTION OF DRAWINGS

FIG. 2-1 is an explanatory diagram of IP transformation of broadcast content (on a transmitting side);

FIG. 2-2 is an explanatory diagram of IP transformation of broadcast content (on a receiving side);

FIG. 6 is a chart of an example of an IP multicast table;

FIG. 8 is a flowchart of an example of receiving processing of broadcast content for each group, on the receiving side;

FIG. 9-1 is an explanatory diagram for a case in which broadcast content is transmitted by unicast; and FIG. 9-2 is an explanatory diagram for a case in which broadcast content is transmitted by multicast.

Figure 1:
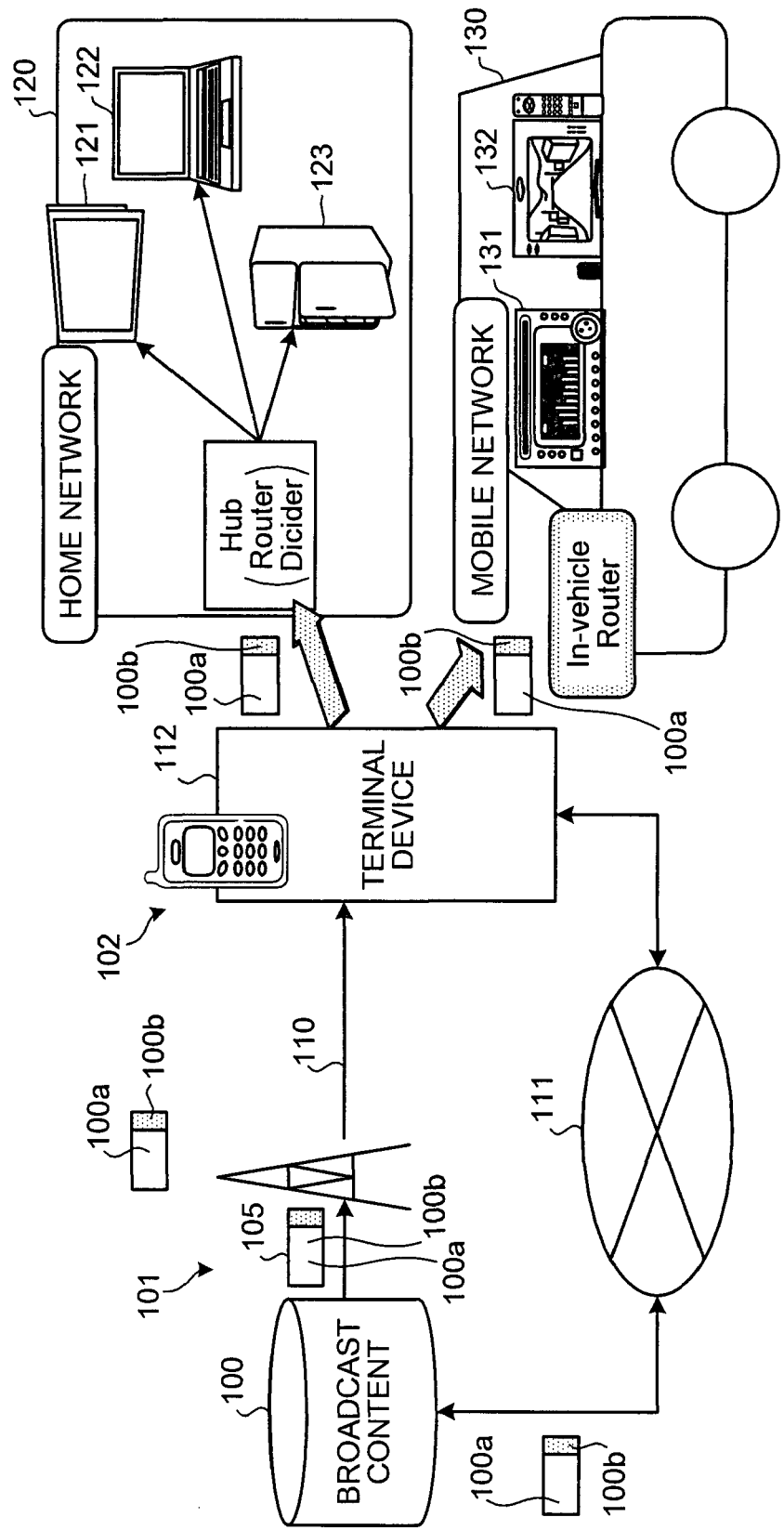
FIG. 1 is a configuration diagram of a broadcast-content transmission apparatus of the present invention.

EXPLANATIONS OF LETTERS OR NUMERALS 100 broadcast content
100a IP packet
100b IP header
101 transmitting side
102 receiving side
105 transmission packet
110 broadcast network
111 communication network
112 terminal device
120 home network
130 mobile network

BEST MODE(S) FOR CARRYING OUT THE INVENTION

Embodiment

With reference to the accompanying drawings, exemplary embodiments of the broadcast-content transmission apparatus and the broadcast-content transmission method according to the present invention are explained in detail below.

FIG. 1 is a configuration diagram of a broadcast-content transmission apparatus of the present invention. Broadcast content 100 is transmitted to a terminal device 112 on a receiving side 102 through a broadcast network 110 for terrestrial digital broadcasts on a transmitting side 101 or a communication network 111 such as the Internet.

The broadcast content 100 is transmitted from the transmitting side 101 through the communication network 111 as an IP packet 100a to which an IP header 100b is added. When transmitted through the digital broadcast network 110, the IP packet 100a is encapsulated within a transmission packet 105 in a given format for a digital broadcast signal. The broadcast content 100 transmitted through the broadcast network 110 and the communication network 111 can be received on a terminal device 112 side. The broadcast content 100, i.e., the IP packet 100a transmitted through the communication network 111, can be selectively acquired based on the IP header 100b (IP address) as an identifier. Likewise, the IP header 100b (IP address) encapsulated along with the IP packet 100a in the transmission packet 105 transmitted through the broadcast network 110 can be used to selectively acquire the broadcast content 100. Encapsulation of the transmission packet 105 is explained hereinafter.

The terminal device 112 may be, for example, a mobile terminal such as a cellular phone and PDA, a fixed terminal, such as personal computer (PC), or a special-use set-top box. Additionally, the terminal device 112 can execute routing to output devices according to the IP address of the broadcast content 100 received. The terminal device 112 preliminarily stores therein a routing table with IP addresses correlated thereto, and can execute routing of the broadcast content 100 by selecting, based on the IP address, either a home network 120 or a mobile network 130, or both.

As shown in FIG. 1, the terminal device 112 can access the home network 120 such as a home LAN, and transmit the broadcast content 100 to a television 121, a personal computer 122, an information home appliance 123, etc. that are connected to the home network 120. Additionally, the terminal device 112 can access the mobile network 130 such as an in-vehicle LAN, and transmit the broadcast content 100 to a car audio device 131, a car navigation device 132, etc. that are connected to the mobile network 130.

Thus, end-to-end communication can be executed between the transmitting side 101 and the receiving side 102 based on the IP address of the broadcast content 100 as an identifier. Particularly, the broadcast content 100 can be transmitted by one transmitting side 101 to plural terminal devices 112 specified as a group, or to the devices (121, 122, 123, 131, and 132) routed through the terminal device 112. Selective routing and reception using an IP address is explained in detail hereinafter.

Figures 1, 2:
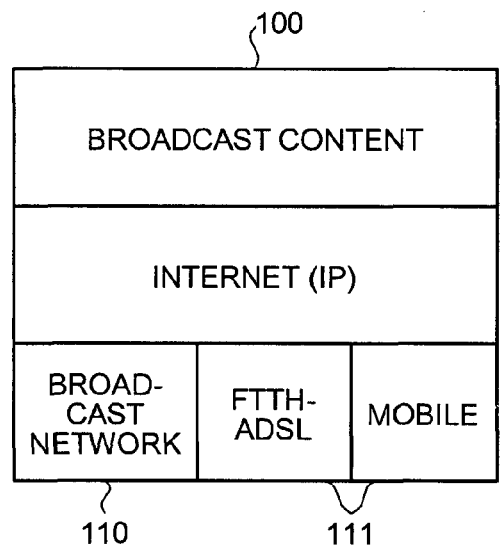
Figure 2:
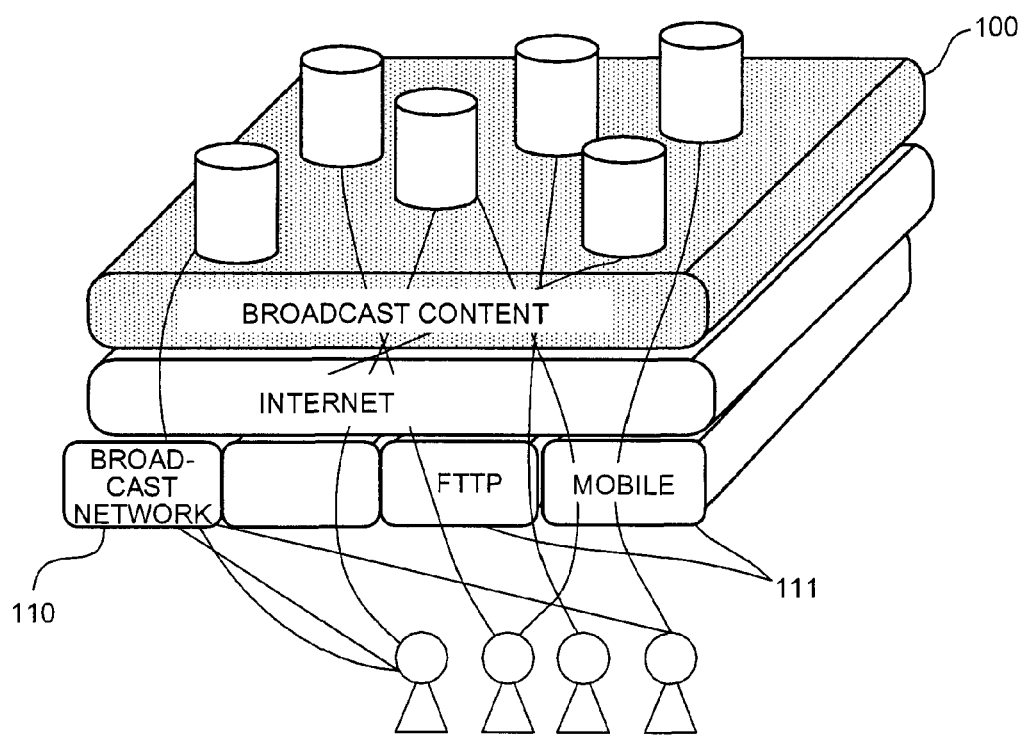

FIGS. 2-1 and 2-2 are explanatory diagrams of IP transformation of broadcast content. FIG. 2-1 is a diagram for the transmitting side 101, and the FIG. 2-2 is a diagram for the receiving side 102. As shown in FIG. 2-1, a single item of the broadcast content 100 may be generated on the broadcast-content transmitting side 101 without consideration of the differences between the broadcast network 110 and the communication network 111. The transmitting side 101 executes IP transformation on the broadcast content 100 according to a general platform IP. The broadcast content 100 subjected to the IP transformation can be transmitted through the broadcast network 110, or the communication network 111 such as an FTTH, an ADSL communication network, and a mobile communication network.

Thus, in the broadcast network 110 and the communication network 111, IP becomes the common layer, and the broadcast content 100 can be shared based on IP. As a result, for example, the broadcast content 100 that has been conventionally transmitted only through the communication network 111 such as the Internet can be transmitted through the broadcast network 110. Concurrent distribution of plural broadcast programs is enabled by such IP transformation and IP multicast explained hereinafter.

As shown in FIG. 2-2, on a user side that receives the broadcast content 100, the broadcast content 100 can be acquired from an available transmission network (the broadcast network 110 or the communication network 111) without regard to the difference in transmission media of the broadcast content 100. The IP transformation of the broadcast content 100 enables concurrent distribution of plural programs. A program corresponding to attribute information set in advance by a user or circumstances of a receiving position can be automatically received. Additionally, the transmitting side 101 can specify a recipient by setting an IP address in advance, and transmitting the broadcast content 100.

Figure 3:
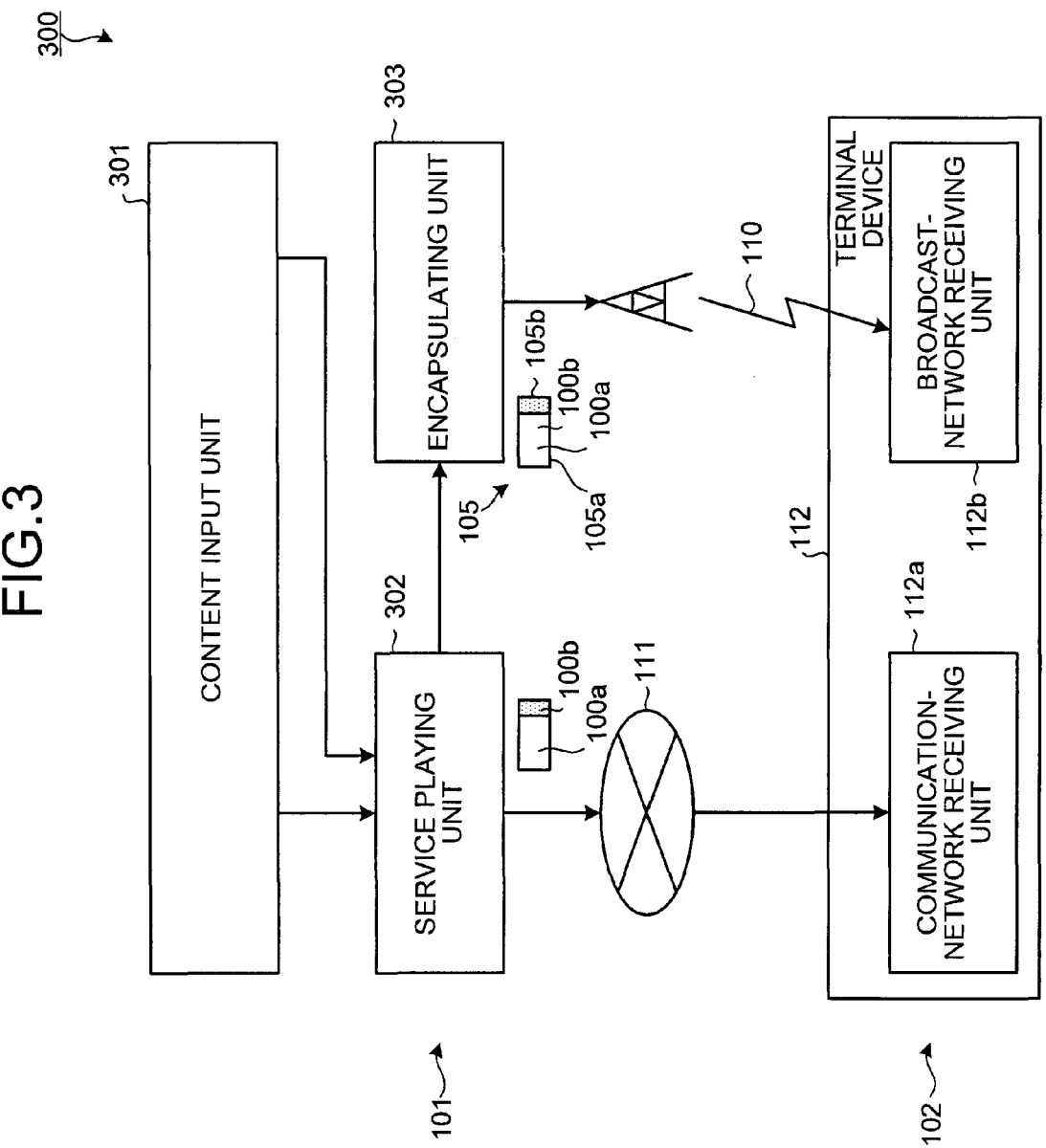
FIG. 3 is a block diagram of a configuration of encapsulation of content.

FIG. 3 is a block diagram of a configuration of encapsulation of content. A source to be transmitted as the broadcast content 100 (see FIG. 1) is input to a content input unit 301 on the transmitting side 101 (see FIG. 1). The broadcast content 100 includes a broadcast program, and content stored in a recording medium such as a DVD, for example. These can include not only a combination of information from a camera and a microphone, such as an image signal and an audio signal for TV, etc., but may also be only an image signal of still or moving images, an audio signal, or data.

The broadcast content 100 to be transmitted through the broadcast network 110 or the communication network 111 is input to the content input unit 301 of the present embodiment. A service playing unit 302 is constituted by a service playing device on the communication network 111 (for example, a web server) for Internet content. The service playing unit 302 packetizes, as the IP packet 100a, the broadcast content 100 input to the content input unit 301, adds the IP header 100b thereto, and transmits the packetized broadcast content 100 to the terminal device 112 on the receiving side 102 through the communication network 111 such as the Internet.

Although the content input unit 301 and the service playing unit 302 has been conventionally required for the broadcast network 110 and the communication network 111 respectively, according to the present embodiment, regardless of the transmission medium, i.e., the broadcast network 110 and the communication network 111, the broadcast content 100 is input to a common content input unit, i.e., content input unit 301, and packetized by a common service playing unit, i.e., the service playing unit 302. As a result, there is no need for a broadcast service playing device, such as a broadcast playing device and a broadcast relay device (specifically, a tape deck, a digital player, etc.) that has been required conventionally.

The IP packet 100a IP packetized by the service playing unit 302 can be received by a communication-network receiving terminal 112a such as a personal computer (PC) and a PDA through the communication network 111 such as the Internet. Additionally, the IP packet 100a IP packetized by the service playing unit 302 can be converted into a format transmittable through the broadcast network 110 by an encapsulating unit 303.

To transmit the IP packet 100a through the broadcast network 110, the encapsulating unit 303 encapsulates the IP packet 10a into the transmission packet 105 of a given format used in the broadcast network 110. For example, in the case of a transmission format of MPEG2-TS, the entire IP packet 10a (including the IP header 100b) is inserted in a MPEG2-TS payload 105a, and a MPEG2-TS header 105b is added thereto for transmission through the broadcast network 110 to a broadcast-network receiving terminal 112b on the receiving side 102. The broadcast-network receiving terminal 112b decodes the MPEG2-TS transmission packet 105, extracts the IP packet 100a, and then plays the broadcast content 100.

The terminal device 112 may be a device corresponding to the communication-network terminal device 112a or the broadcast-network terminal device 112b, or a device having both receiving functions of the communication-network terminal device 112a and the broadcast-network terminal device 112b.

The above configuration of IP packetizing by the addition of an IP header for transmission is specifically explained. By the IP packetizing of broadcast content, destination IP addresses can be grouped to selectively provide, to plural groups, broadcast content respectively suitable for each group. A configuration for receiving broadcast content for each group is explained hereinafter.

Figure 4:
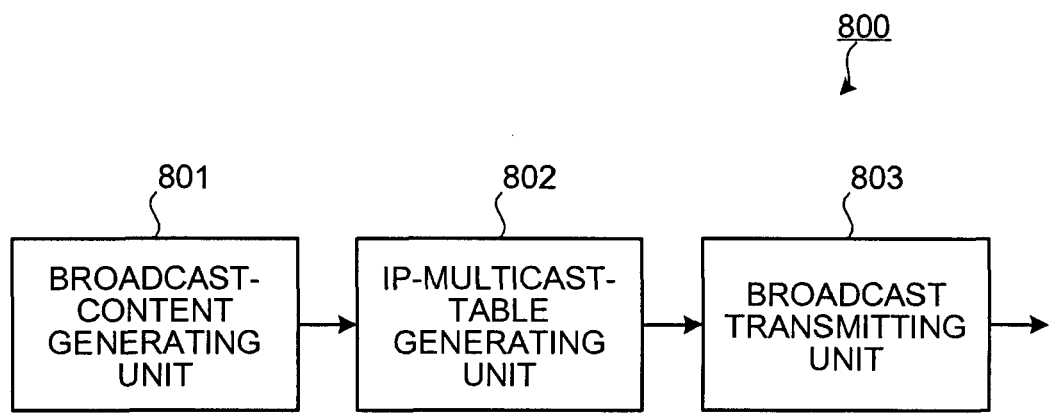
FIG. 4 is a block diagram of a grouping and transmitting unit that groups broadcast content on a transmitting side.

FIG. 4 is a block diagram of a grouping and transmitting unit that groups broadcast content on the transmitting side. A grouping and transmitting unit 800 is provided on the transmitting side 101 (see FIG. 1). Plural content items are generated as the broadcast content 100 above by the broadcast-content generating unit 801. Content items already generated may be sequentially input to the broadcast-content generating unit 801 from an external device, as the broadcast content 100.

An IP-multicast-table generating unit 802 generates an IP multicast table of information correlating an IP-multicast group address for each content item of the broadcast content 100 and information concerning a preferred recipient. A transmitting unit 803 transmits the IP multicast table generated by the IP-multicast-table generating unit 802 to an arbitrary receiving node (the terminal device 112 on the receiving side 102) through the broadcast network 110 and the communication network 111.

Figure 5:
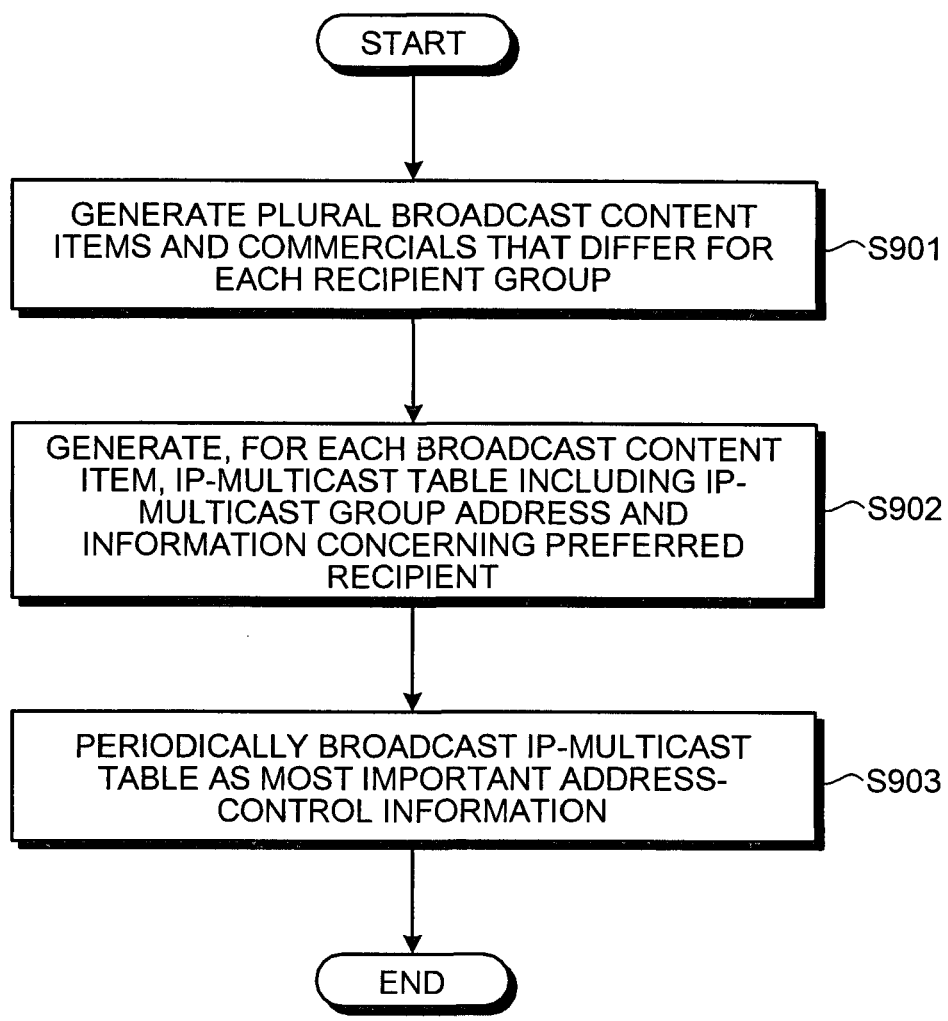
FIG. 5 is a flowchart of an example of transmitting processing of broadcast content for each group, on the transmitting side.

FIG. 5 is a flowchart of an example of transmitting processing of broadcast content for each group, on the transmitting side. By IP transformation of broadcast content, the terminal devices 112 on the receiving side 102 (see FIG. 1) can be grouped to transmit (broadcast) a program that differs for each group.

The transmitting side 101 preliminarily generates plural broadcast content items or commercials that differ for each recipient group (step S901). For each content item of the broadcast content 100, the IP multicast table including an IP-multicast group address and information concerning a preferred recipient is generated (step S902). As the most-important address-control information, this IP multicast table is periodically transmitted to an arbitrary terminal device 112 on the receiving side 102 through the broadcast network 110 and the communication network 111 (step S903). Thereby, the arbitrary terminal device 112 on the receiving side 102 receives the IP multicast table.

FIG. 6 is a chart of an example of the IP multicast table. An IP-multicast table 1000 is one in which two IP-multicast group addresses of A and B are set. With regard to the IP-multicast group address A, the broadcast content is a program for the mountains, and the preferred recipient is one having GPS information indicative of a position along a mountain side (in addition to other attribute information, etc.). With regard to the IP-multicast group address B, the broadcast content is a program for the coast, and the preferred recipient is one having GPS information indicative of a position along a coast (in addition to other attribute information).

Figure 7:
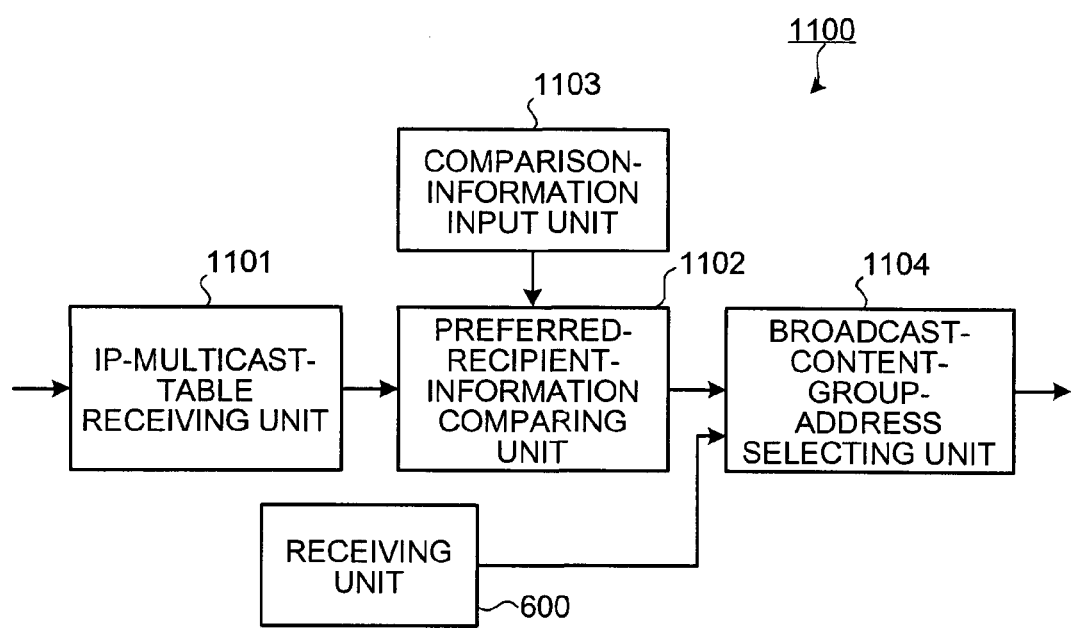
FIG. 7 is a block diagram of a grouping and receiving unit that receives broadcast content for each group on a receiving side.

FIG. 7 is a block diagram of a configuration of a grouping and receiving unit that receives broadcast content for each group on the receiving side. A grouping and receiving unit 1100 is provided in the terminal device 112 (see FIG. 1).

An IP-multicast-table receiving unit 1101 receives the IP multicast table transmitted from the transmitting side 101 (see FIG. 1). A preferred-recipient-information comparing unit 1102 compares information on the terminal device 112 side input through a comparison-information input unit 1103 and information concerning the preferred recipient set in the IP multicast table transmitted from the transmitting side 101. Therefore, the information concerning a recipient is input to the comparison-information input unit 1103. In the example shown in FIG. 7, a non-depicted GPS unit is connected to the comparison-information input unit 1103, and current position information of the terminal device 112 is input thereto.

A comparison result by the preferred-recipient-information comparing unit 1102 is output to a broadcast-content-group-address selecting unit 1104. At this time, the preferred-recipient-information comparing unit 1102 selects either of the IP-multicast group addresses A and B set in the IP multicast table 1000 shown in FIG. 6 based on the comparison result, and outputs the selected IP multicast group address to the broadcast-content-group-address selecting unit 1104.

The broadcast-content-group-address selecting unit 1104 shown in FIG. 7 selects, from a receiving unit 600, broadcast content 100 corresponding to the IP-multicast group address A or B output from the preferred-recipient-information comparing unit 1102 to enable reception thereof by the terminal device 112. Although the IP-multicast group address A or B is selected after the receiving unit 600 receives all of the broadcast content 100 in the configuration of FIG. 7, the configuration is not limited hereto, and the broadcast-content-group-address selecting unit 1104 can be configured to acquire, with regard to the IP packets 100*a* input to the receiving unit 600, only the packets corresponding to the selected IP-multicast group address A or B, and discard other packets.

FIG. 8 is a flowchart of an example of receiving processing of group-specific broadcast content on the receiving side. The terminal device 112 on the receiving side 102 (see FIG. 1) receives an IP multicast table transmitted thereto (step S1201). At this time, this IP multicast table is received without regard to the setting of the IP address of a receiving interface of the receiving terminal device 112.

Information concerning a preferred recipient included in the IP multicast table and information concerning the terminal device 112 are compared (step S1202). For example, if the terminal device 112 can acquire current position information using the GPS, etc., the current position information and position information set as the information concerning the preferred recipient are compared.

The IP-multicast group address specifying preferred recipient information closest to the setting is acquired and set as the IP address of the receiving interface (step S1203). As a result, the broadcast content 100 transmitted with the set IP-multicast group address can be received (step S1204), and this broadcast content 100 can be viewed. Here, the terminal device 112 on the receiving side 102 can receive the broadcast content 100 matching the preferred recipient set on the transmitting side 101. Specifically, if a current position of the terminal device 112 is along a mountain, a program for the mountains can be received, whereas if the current position of the same terminal device 112 is on a coast, a program for the coast can be received.

It is determined whether the IP multicast table 1000 (see FIG. 6), or position information and attribute information of the terminal device 112 has changed (step S1205), when there is no change (step S1205: YES), the broadcast content 100 that has been received at step S1204 continues to be received (playing of the broadcast content). On the contrary, when there is change (step S1205: NO), the process returns to step S1202, and processing after the comparison of the information concerning the preferred recipient using the IP multicast table is executed again. The processing above is executed and the receiving processing of the group-specific broadcast content ends.

FIG. 9-1 is a diagram for a case in which broadcast content is transmitted by unicast. In IP unicast, even if the same information (broadcast content 100) is transmitted, the transmitting side 101 (a transmitting station 1301 shown) executes transmitting processing to IP addresses A to D corresponding to receiving devices A to D on the receiving side 102 (1302*a* to 1302*d*). In the case of the transmitting by unicast, each of the packets having addresses A to D is independently transmitted to the receiving side 102 through a router, etc.

FIG. 9-2 is a diagram for a case in which broadcast content is transmitted by multicast. In the case of IP multicast, by multicasting with an address (shown IP address: X) to a multicast address group, plural receiving devices A to D on the receiving side (1303*a* to 1303*d*) set as the corresponding multicast address group (IP address: X) receive the same information (broadcast content 100). In the multicast compared to the unicast, the processing on the transmitting side 101 (the transmitting station 1301) can be executed by transmitting a single packet with one multicast address, and transmission band can be saved, thereby enabling a reduction in processing load on the transmitting side 101, a router on a path, etc.

The terminal devices 112 on the receiving side 102 are grouped, and the broadcast content 100 differing for each group can be received by the transmission of the broadcast content with an address group. As an example of a configuration for receiving the broadcast content 100 specific to each group, as explained above, various groupings are possible in addition to the grouping by area, such as in the mountains and on the coast.

For example, as the attribute information of the terminal device 112 explained above, grouping of the terminal devices 112 by model, function, or by user age or gender is possible. Broadcast content suitable for each of these groups can be received. Additionally, on the transmitting side 101, position information detected by a non-depicted GPS unit provided in the terminal device 112 on the receiving side 102 can be received through bidirectional communication, and unique broadcast content 100 can be transmitted through the broadcast network 110 limited to a special area. Furthermore, emergency information can be locally transmitted to the terminal device 112 in an area affected by a disaster.

The broadcast content 100 may be a commercial independent from a broadcast program, only the commercial may be different for each area as explained above even if the broadcast program is identical, and the commercial may differ according to model, function of the terminal device 112 or the age or gender of a user of the terminal device 112. As a result, the effectiveness of commercials can be enhanced, and added value for the broadcast content 100 can be also enhanced.

Recently, a cellular phone, PDA, and a laptop personal computer are more likely to be owned by an individual user. Therefore, the broadcast content 100 differing according to age, gender, or preference of a user of the terminal device 112 can be transmitted by the transmitting side 101 managing information concerning the user.

Since the terminal device 112 can receive the broadcast content 100 through both the broadcast network 110 and the communication network 111, the terminal device 112 having this function, such as a cellar phone, functions as a gateway that receives the broadcast content 100. In other words, for example, even if the home network 120 or the mobile network 130 shown in FIG. 1 does not have a function of receiving a broadcast signal such as that for terrestrial digital broadcasts, a single cellular phone capable of receiving a broadcast signal, such as that for the terrestrial digital broadcasts, enables viewing of the broadcast content by transmitting the broadcast content 100 to various devices connected to the home network 120 or the mobile network 130.

Downward traffic from the transmitting side 101 to the receiving side 102 (terminal device 112) transmits the broadcast content 100 to the terminal device 112 through the broadcast network 110 or the communication network 111. The volume of the downward traffic is large. Therefore, in addition to the broadcasting of normal broadcast programs, band that becomes available may be used for transmission of the broadcast content 100 explained above. As a result, the transmitting side 101 can develop a new ISP-type broadcast service. With regard to upward traffic from the receiving side 102 (terminal device 112) to the transmitting side 101, bidirectional communication is enabled using a cellular phone network and a fixed network that constitute the communication network 111. Additionally, the transmitting side 101 can allow an ISP to use a free band in the downward traffic.

The terminal device 112 on the receiving side 102 can have a configuration in which plural terminal devices 112 communicate with one another. This communication is not limited to communication through the communication network 111 such as the Internet, and may be an ad-hoc network through which plural terminal devices 112 such as a cellular phone directly communicate with one another not through a base station. In this case, each of the terminal devices 112 has an IP address. As a result, the broadcast content 100 received by the terminal device 112 through the broadcast network 110 or the communication network 111 can be transferred to another terminal device 112 through the communication among the terminal devices 112. The communication among the terminal devices 112 is not limited to one transfer, and the broadcast content 100 can be transferred to an end terminal device 112 within an area where the plural terminal devices 112 can directly communicate with one another. With such a configuration, a new service can be provided such as a case in which broadcast content upon a disaster can be transferred, through another terminal device 112, to the terminal device 112 incapable of utilizing a base station upon the disaster, etc.

As explained above, according to the broadcast-content transmission apparatus and the broadcast-content transmission method of the present invention, the same broadcast content can be transmitted to a user through the broadcast network or the communication network without restriction between the broadcast network and the communication network. As a result, operations of a producer of the broadcast content and on the transmitting side can be omitted, and the broadcast content that had been subject to transmission restrictions according to each network can be flexibly received. Additionally, the IP transformation of the broadcast content enables the transmitting side to specify a desired terminal device to execute transmission, and the receiving side to select broadcast content suitable for a position and an attribute of the terminal device, or an attribute of a user thereof to execute reception. As a result, plural broadcast content items can be transmitted according to user.

The broadcast-content transmission method explained in the present embodiment can be implemented by a computer, such as a personal computer and a workstation, executing a program that is prepared in advance. This program is recorded on a computer-readable recording medium such as a hard disk, a flexible disk, a CD-ROM, an MO, and a DVD, and is executed by being read out from the recording medium by a computer. This program can be a transmission medium that can be distributed through a network such as the Internet.

INDUSTRIAL APPLICABILITY

As explained above, the broadcast-content transmission apparatus and the broadcast-content transmission method of the present invention are useful for a broadcast network and a communication network through which a broadcast program is concurrently distributed to plural terminal devices, and suitable particularly for a terminal device on a receiving side and a device on a transmitting side that transmits broadcast content through a broadcast network such as that for digital satellite broadcasts and digital terrestrial broadcasts, as well as a communication network such as the Internet.

The invention claimed is:

1. A broadcast-content transmission and receiving system, comprising:
   a broadcast-content transmission apparatus, comprising:
      an IP packetizing unit that adds an IP header to a content item and IP packetizes the content item into an IP packet, the IP header being added to the content item for transmitting the content item through a communication network;
      a first transmitting unit that transmits the IP packet through the communication network;
      an encapsulating unit that encapsulates the IP packet into a transmission packet, the IP packet being encapsulated for transmitting the content item through a broadcast network which is different from the communication network;
      a second transmitting unit that transmits the transmission packet through the broadcast network by IP multicast; and
      an IP-multicast-correspondence-information generating unit that generates, for each content item, information that concerns IP multicast correspondence and correlates an IP-multicast group address and a condition for receiving the content item by a broadcast content receiving apparatus, the IP-multicast group address being an address that groups receiver broadcast content receiving apparatus and is used for the broadcast content receiving apparatus to select a content item; and
   the broadcast-content receiving apparatus, comprises:
   a communication network receiving unit that receives, through the communication network, the IP packet that includes the packetized content item and the IP header added to the packetized content item for the purpose of transmitting the content item through the communication network;
   a broadcast network receiving unit that receives, through the broadcast network that is different from the communication network, the transmission packet that is formed by encapsulating the IP packet, the IP packet being encapsulated for the purpose of transmitting the content item through the broadcast network;
   an extracting unit that decapsulates the transmission packet received by the broadcast network receiving unit, and extracts the content item included in the IP packet;
   an IP-multicast-correspondence-information receiving unit that receives, for each content item, the information that concerns the IP multicast correspondence and correlates the IP-multicast group address and the condition for receiving the content item, the IP-multicast group address being the address that groups the broadcast content receiving apparatus and is used for the broadcast content receiving apparatus to select a content item;
   an IP address selecting unit that selects, when the condition for receiving the content item matches a predetermined condition, the IP-multicast group address corresponding to the condition for receiving the content item and sets the selected IP-multicast group address as an IP address for receiving the content item; and
   a routing unit that transmits the content item to an external device connected to a given communication network.

2. The broadcast-content transmission apparatus according to claim 1, wherein the content item is also transmitted through the communication network as the IP packet.

3. The broadcast-content receiving apparatus according to claim 1, wherein the content item is also received through the communication network as the IP packet.

4. A broadcast-content transmission and receiving method comprising:

- an IP packetizing step of adding an IP header to a content item and IP packetizing the content item into an IP packet, the IP header being added to the content item for transmitting the content item through a communication network;
- a transmitting step of transmitting the IP packet through the communication network;
- an encapsulating step of encapsulating the IP packet into a given transmission packet, the IP packet being encapsulated for transmitting the content item through a broadcast network which is different from the communication network;
- a transmitting step of transmitting the transmission packet through the broadcast network by IP multicast;
- an IP-multicast-correspondence-information generating step of generating, for each content item, information that concerns IP multicast correspondence and correlates an IP-multicast group address and a condition for receiving the content item by a broadcast content receiving apparatus, the IP-multicast group address being an address that groups the broadcast content receiving apparatus and is used for the broadcast content receiving apparatus to select a content item;
- a receiving step of a broadcast content receiving apparatus receiving, through the communication network, the IP packet that includes the packetized content item and the IP header added to the packetized content item for the purpose of transmitting the content item through the communication network;
- a receiving step of the broadcast content receiving apparatus receiving, through the broadcast network that is different from the communication network, the transmission packet that is formed by encapsulating the IP packet, the IP packet being encapsulated for the purpose of transmitting the content item through the broadcast network;
- an extracting step of decapsulating the transmission packet received through the broadcast network, and extracting content item included in the IP packet;
- an IP-multicast-correspondence-information receiving step of receiving, for each content item, information that concerns the IP multicast correspondence and correlates the IP-multicast group address and the condition for receiving the content item, the IP-multicast group address being the address that groups the broadcast content receiving apparatus and is used for the broadcast content receiving apparatus to select a content item;
- an IP address selecting step of selecting, when the condition for receiving the content item matches a predetermined condition, the IP-multicast group address corresponding to the condition for receiving the content item and setting the selected IP-multicast group address as an IP address for the content item; and
- routing the content item to an external device connected to a given communication network.

* * * * *